United States Patent [19]

Shuker

[11] Patent Number: 4,463,932

[45] Date of Patent: Aug. 7, 1984

[54] WINCH

[75] Inventor: Brian Shuker, Portsmouth, England

[73] Assignee: Lewmar Marine Limited, Hampshire, England

[21] Appl. No.: 493,596

[22] Filed: May 11, 1983

[30] Foreign Application Priority Data

Oct. 8, 1982 [GB] United Kingdom ................ 8228815

[51] Int. Cl.[3] ........................ B66D 1/30; F16B 21/00

[52] U.S. Cl. .................................. 254/266; 254/342; 254/371; 403/326

[58] Field of Search ............... 254/371, 342, 344, 345; 411/356, 511, 539; 403/326, 360

[56] References Cited

U.S. PATENT DOCUMENTS

Re. 30,881 3/1982 Huggett et al. .................... 254/345
3,298,409 1/1967 Elson ............................ 403/326 X
4,151,980 5/1979 Burton et al. ...................... 254/371

FOREIGN PATENT DOCUMENTS 975991 10/1950 France .............................. 411/539

*Primary Examiner*—Stuart S. Levy
*Assistant Examiner*—Katherine Jaekel
*Attorney, Agent, or Firm*—Cushman, Darby and Cushman

[57] ABSTRACT

A winch having a central shaft held axially in place by keys in the form of collets, a tongue of which penetrates an aperture in a stationary column of the winch and runs in a groove in the shaft. The collets are readily assembled to the winch by being trapped in a recess under a top cap. Bolts may, in a self-tailing winch, not only restrain the collets but also a hub bearing the arm of a line guide. In a self-tailing winch, the bolts pass through passages in the collets so that the collets attach the entire winch top assembly to the casing and hold it in the desired angular position.

7 Claims, 3 Drawing Figures

WINCH

FIELD OF THE INVENTION

This invention relates to winches of the manually powered type which are used on yachts and similar pleasure vessels.

BACKGROUND OF THE INVENTION

Such winches usually have an upright stationary casing, a rotatable drive shaft radially within and extending along the casing, and a winch drum radially outside the casing. In the manufacture of such a winch it is normal to assemble any gearing about the casing before slipping the drum over the upper end of the casing and into place. The drive shaft is inserted (also from the upper end) whenever convenient. In order to hold the drum down, it is usual to fix a winch top assembly to the casing above the drum. The upper end of the drive shaft will extend through a central hole in the winch top assembly so that a drive handle for turning the winch can be connected to it. It is also necessary to hold the drive shaft axially in position. Apart from the general inconvenience of having a piece which can readily come out and get lost or damaged, it would be highly dangerous if the drive shaft slid upwards during winching and ceased to mesh with the drive gear. In some designs of winch at least the presence of the drive shaft is necessary for the operation of the safety ratchet which prevents that drum from rotating in reverse.

It is known to key a circumferential groove in the drive shaft to the casing by inserting keys into the groove through holes in the casing. A ring around the casing stops the keys from coming out of place by a radially outward movement. The ring must in turn be held axially at the level of the keys. (See UK patent specification No. 2061862).

SUMMARY OF THE INVENTION

The present invention provides a particularly simple and effective way of retaining the central rotating shaft of the winch inside its cylindrical stationary casing. It involves use of a type of keying means, which we shall refer to as collets, which are retained by the winch top assembly of the winch. A collet has a tongue which projects through a hole in the casing into a continuous groove in the shaft thereby holding the shaft axially in the casing. It also has a main body outside the casing (preferably the collet is an essentially semi-annular flat pressing or stamping) whereby the collet itself forms part of and interacts with the winch top assembly to be retained against radial dislodgement. The main body will usually be sandwiched below the top cap of the top assembly and be retained by securing means passing downwards from the top cap, which may also act to hold the top cap against rotation; and the greater advantage occurs when the winch is a self-tailing winch because the same retaining means for the top cap and the collets may act to position a ring from which the feeder arm of the self-tailing arrangement projects radially to outside of the winch.

The arrangement proposed in this invention has the advantage of considerable simplicity of manufacture while allowing the adoption of quite a wide range of angular positions in the relationship between the top cap, the feeder arm, and the casing, which previously was conventionally assured by providing splining or the like on the upper extremity of the casing with interacting splining on the inside of the feeder arm ring and on a cylindrical face provided on the top cap. Additionally, the collets are easier to make and insert than the prior art keys.

DESCRIPTION OF THE DRAWINGS AND OF A PREFERRED EMBODIMENT

A particular embodiment of the present invention wll be described with reference to the accompanying drawings, in which.

Figure 1:
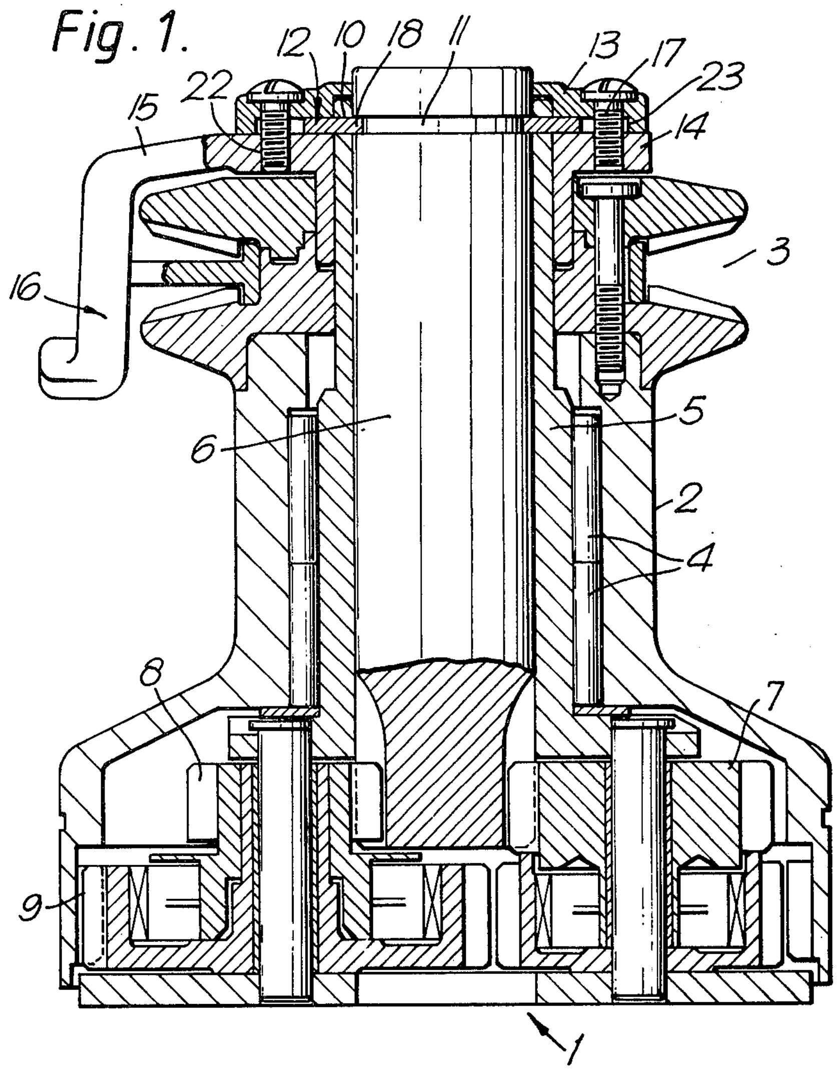
FIG. 1 is a diametrical section through the embodiment.

FIG. 1 shows a manually operable self-tailing winch 1 incorporating a winch drum 2 and a self-tailing channel 3 constrained to rotate with the drum. The drum is mounted for rotation by means of bearings 4 on a cylindrical casing 5 which is stationary. There is a shaft 6 inside the casing which is driven by a crank handle from its top end (the crank handle and a corresponding socket in the shaft are not shown) to transmit rotation to alternative gear trains 7,8 which are in the base of the winch and which drive the drum 2 through an internal gear track 9. The arrangement and nature of the gearing forms no part of the present invention and the invention is applicable to winches which are driven directly and/or through a single gear train or through a plurality of gear trains.

Figure 2:
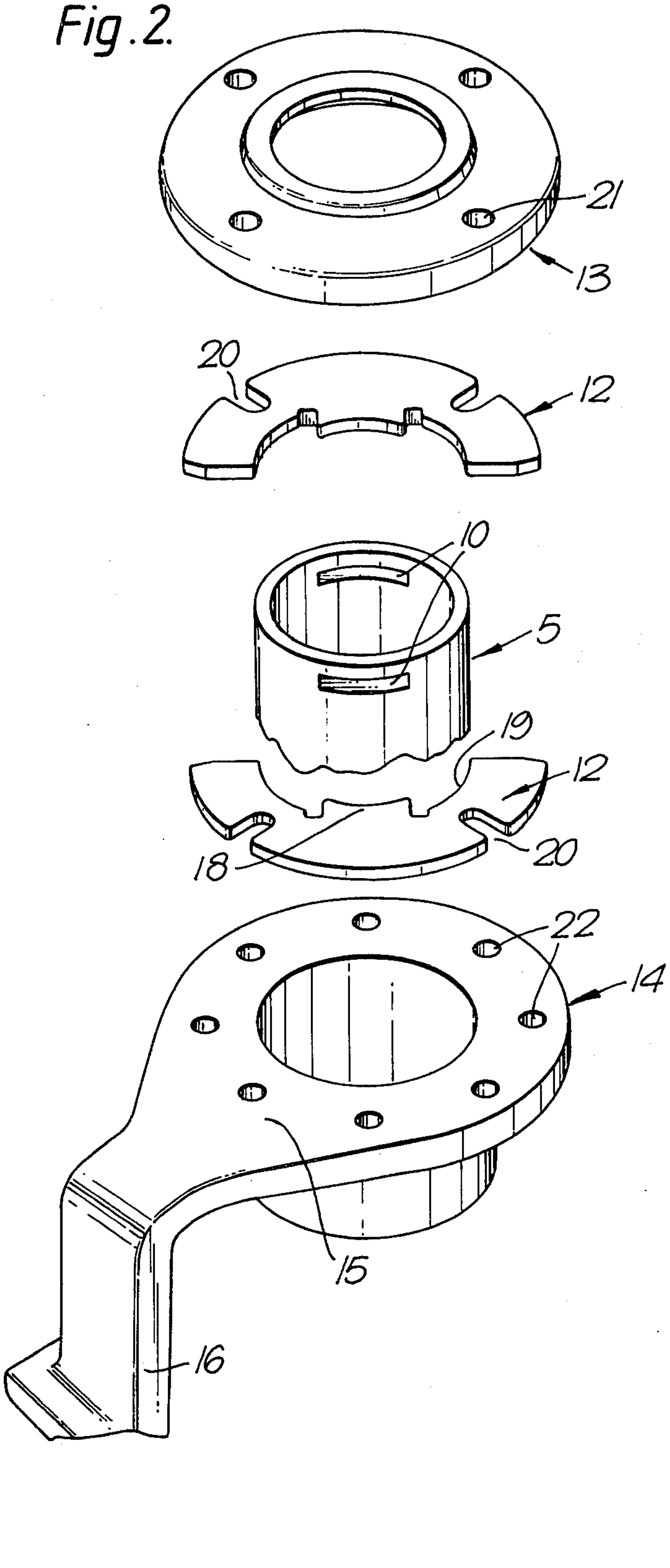
FIG. 2 is an exploded view of it.

The shaft 6 is held axially in the winch by keying means which, as can be seen from FIG. 1, are collets projecting through apertures 10 in the upper end of the casing 5 to engage in an annular groove 11 in the upper end portion of the shaft 6. The collets 12 form a part of the winch top assembly and are sandwiched between a top cap 13 of the winch and a stationary flange 14 provided, in this embodiment, by the upper surface of the ring from which radially projects the arm 15 of the line guide 16 of the self-tailing arrangement. It can be seen that the undersurface of the top cap 13 is recessed to accommodate the thickness of the collets 12 the wall 23 of the recess being able to hold the collet against radially outward movement. The top cap is assembled to the flange 14 by screws 17. As can be seen more clearly from FIG. 2, the collets' main bodies are semi-circular annuli fromed of flat metal. Projecting from the inner periphery of the part-circle of each collet is a tongue 18 of which the tangential extent is substantially the same as that of the aperture 10 into and through which it can fit, and when it so fits the inner periphery 19 of each collet 12 is tight up against the outer surface of the casing 5 and the innermost part of the tongue 18 is engaging the groove 11 in the shaft 6.

In the outer periphery of each collet are recesses 20 which are to allow passage of the assembling screws 17.

Figure 3:
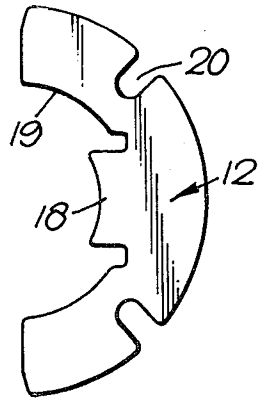
FIG. 3 is a plan view of one collet.

FIG. 3 shows the outline of a collet 12 in more detail.

It can be seen that in assembly of the upper part of the winch, lower parts having previously been positioned and the shaft 6 inserted, the ring 14 is slipped over the casing 5, the collets are brought in radially from each side so that the tongues 18 penetrate through the apertures 10 and at the same time engage into the recess 11, the top cap is placed over and screw holes 21 in the top cap are aligned with the recesses 20 of the collets and with selected ones of a larger plurality of screw holes 22 in the ring 14 so that the angular relationship both of the top cap and of the feeder arm to the casing 5 is a desired one. A simple tightening of the screws then secures at the same time this top assembly against movement and rotation and the central shaft 6 against axial displacement, and allows free rotation of drum 2 with specified end float.

Although the construction using the present keying means has been shown in a self-tailing winch it is also applicable to ordinary winches, i.e. those lacking self-tailing means.

What I claim is:

1. A manually powered marine winch having:

a casing with a generally cylindrical wall, the axis of the cylinder being generally vertical in use, the wall having a hole therein;

a rotatable drive shaft located radially within the casing and extending axially thereof and having a continuous circumferential groove;

a winch drum mounted radially outside the casing and means for driving the drum in rotation from the drive shaft;

a winch top assembly fast with the casing and effective to restrain axially upward movement of the drum relative to the casing; and keying means including at least one collet with a main body situated radially outside the casing and having a tongue which extends through the hole in the casing and into the said groove in the drive shaft, the tongue and the sides of the hole co-acting to restrain the collet from axial and circumferential movement, and the collet and drive shaft fixing the drive shaft axially relative to the casing;

the winch top assembly including a winch top cap and restraining means interactable with the main body of the collet effective to restrain the collet from radially outward movement, the collet and the winch top assembly fixing the winch top assembly axially and rotationally relative to the casing.

2. A winch as claimed in claim 1, wherein the main body of each collet is of semicircular plate form, the tongue being an integral plate-like element projecting radially inwardly from the radially inner periphery of the main body.

3. A winch as claimed in claim 2, wherein the restraining means comprises axially directed screw means engaged with the winch top cap and the semicircular plate of each collet has a plurality of apertures for the passing therethrough of the said screw means, the sides of the apertures co-acting with the screw means to provide the said rotational locating of the remainder of the winch top assembly.

4. A manually powered marine winch as claimed in claim 1, wherein the winch is a self-tailing winch, including members defining a self-tailing channel adjacent to the winch drum and coaxial therewith, and a line guide assembly for the self-tailing channel being comprised in the winch top assembly.

5. A manually powered marine which as claimed in claim 4, wherein the said at least one collet comprise tongued, flat, plate-form elements of which only the tongue penetrates through the window.

6. A manually powered marine winch as claimed in claim 4, wherein the said at least one collet comprise a plurality of passages for screw means passing axially from a top cap of the winch to the line guide assembly, the passages being equally spaced apart, whereby the angular position of the line guide assembly relative to the casing is determined at any one of a plurality of predetermined positions.

7. A manually powered marine winch as claimed in claim 5, wherein the said at least one collet comprise a plurality of passages for screw means passing axially from a top cap of the winch to the line guide assembly, the passages being equally spaced apart, whereby the angular position of the line guide assembly relative to the casing is determined at any one of a plurality of predetermined positions.

* * * * *